United States Patent [19]

Yamamoto et al.

[11] Patent Number: 5,310,829

[45] Date of Patent: May 10, 1994

[54] QUATERNARY POLY(ISO) QUINOLINEDIYL AND PREPARATION THEREOF

[75] Inventors: Takakazu Yamamoto; Takaki Kanbara, both of Yokohama, Japan

[73] Assignee: Tokyo Institute of Technology, Tokyo, Japan

[21] Appl. No.: 37,104

[22] Filed: Mar. 26, 1993

[30] Foreign Application Priority Data

Aug. 12, 1992 [JP] Japan .................. 4-215113

[51] Int. Cl.$^5$ .............................. C08G 73/06
[52] U.S. Cl. .................. 525/540; 502/159; 502/162
[58] Field of Search ......................... 525/540

[56] References Cited

U.S. PATENT DOCUMENTS 5,175,221 12/1992 Chiang et al. ............... 525/540

FOREIGN PATENT DOCUMENTS 1-210420 8/1989 Japan .
5-70565 3/1993 Japan .

*Primary Examiner*—Harold D. Anderson
*Attorney, Agent, or Firm*—Spencer, Frank & Schneider

[57] ABSTRACT

A quaternary (iso)quinolinediyl polymer having a degree of polymerization of at least 5 is produced from an (iso)quinoline polymer by reacting with an alkyl halide and quaternizing the nitrogen atom in ring. Since it is soluble in water and organic solvents, this polymer can be shaped by a dry-process into fibers, films or the like, and had clear change of its color by chemical and electrochemical oxidation reduction.

4 Claims, 1 Drawing Sheet

Proton-NMR spectrum $\delta$ ppm

QUATERNARY POLY(ISO) QUINOLINEDIYL AND PREPARATION THEREOF

BACKGROUND OF THE INVENTION

1. Field of the Invention

The present invention relates to quaternary poly(-quinolinediyl)s or quaternary poly(iso-quinolinediyl)s [hereinafter collectively referred to as "(iso)quinolinediyl polymers"] soluble in organic solvents, and excellent in electrochemical activity, comprising, as a recurring structural unit, a divalent residue of a condensed heterocyclic compound in which nitrogen atom in ring is alkylated, "quaternary quinoline or isoquinoline [hereinafter collectively referred to as "quaternary (iso)-quinoline"], derived by eliminating two hydrogen atoms bonded to the rings therefrom, and manufacturing processes and uses thereof.

2. Description of the Prior Art

Polyarylenes having a structure comprising continuous linkages of aromatic rings, such as poly-p-phenylene, poly-2,5-thienylene and poly-1,4-naphthylene, generally have an excellent heat-resistivity. Besides, it has been known that adducts of these polyarylenes with an electron acceptor such as $AsF_5$ or the like or an electron donor such as lithium, sodium or the like have an electroconductivity and properties utilizable as active materials for primary cells or secondary batteries [for example, "High Molecules", vol.34, p.848 (1985)]. Alternatively, there are proposed in Japanese Patent Application Laid-open No. 1-210,420 electroconductive materials produced by reducing a polymer comprising, as a recurring structural unit, a group comprising a 6-membered heterocyclic unit containing a $\pi$-conjugation system extending continuously along the polymer main chain, for example, 2,5-pyridinediyl group.

However, since most of the hitherto proposed polyarylenes have a low solubility in organic solvents and are infusible, their use is limited and, moreover, problems are posed in drawing out their characteristic functions. Further, it has been desired to develop novel polymers with physical properties the aforementioned conventional polyarylenes have never possessed, by modifying the molecular structures thereof. For example, if polyarylenes different in oxidation-reduction potential from the conventional polyarylenes can be obtained, electrochromic display differing in characteristics from the conventional electrochromic display [for example, described in "Applied Physics" vol.56, p.1433 (1987)] will be able to be provided by using these novel polyarylenes as a component of electrochromic display material such as an electrode material.

SUMMARY OF THE INVENTION

The present invention has been accomplished, under these circumstances, as a result of assiduous studies conducted aiming to find polyarylenes having a novel molecular structure.

An object of the present invention is to provide novel polyarylenes, particularly quaternary (iso)quinolinediyl polymers, being soluble in water and organic solvents and having a clear change of its color by chemical and electrochemical oxidation-reduction.

Another object of the present invention is to utilize such novel quaternary (iso)quinolinediyl polymers as shaped bodies such as fibers, films or the like; electrochromic elements; reducing catalyst; or the like.

The above objects can be achieved by quaternary (iso)quinolinediyl polymers comprising, as a recurring structural unit, a divalent group represented by the following chemical formula (1) or (2):

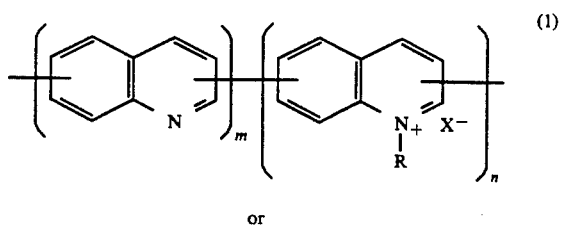

or

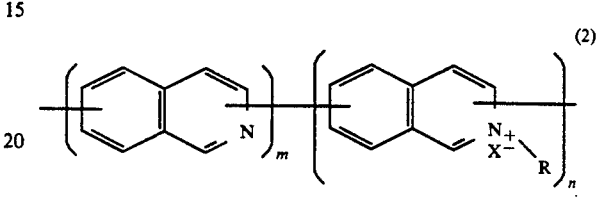

wherein R represents an alkyl group and X represents a halogen atom, which is derived from a condensed heterocyclic compound in which nitrogen atom in ring is alkylated, quaternary (iso)quinoline, by eliminating two hydrogen atoms at arbitrary positions thereof, and having a degree of polymerization (m+n) of at least 5. If the degree of polymerization (m+n) is less than 5, sufficient performances as a polymer will not be able to display. Further, the present inventors have so far confirmed actually through experiments the polymers of the present invention having a degree of polymerization (m+n) of as high as about 30, prepared according to the after-described electrolytically reducing polycondensation process, and excellent properties and usefulness thereof. However, preparation and usefulness of polymers having a degree of polymerization exceeding about 200 can be naturally expected from the technical point of view.

The above-described polymers can be prepared by reacting an (iso)quinolinediyl polymers comprising, as a recurring structural unit, a divalent group represented by the following general formula (3) or (4):

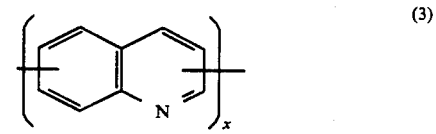

or

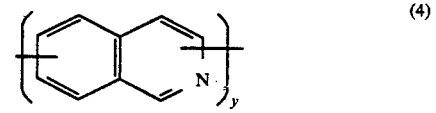

with a alkyl halide and quaternizing the nitrogen atom in the ring. The above (iso)quinoline polymers shown in the general formula (3) or (4) are derivatives of (iso)-quinoline eliminating two hydrogen atoms in arbitrary positions thereof.

The novel quaternary (iso)quinolinediyl polymers according to the present invention can be applied to fibers, films, electrochromic elements by utilizing excellent characteristics thereof, and can be utilized as reducing catalyst after reducing these polymers by means of a reducing agent or an electrochemical method.

BRIEF DESCRIPTION OF THE DRAWINGS

The above and other objects, features and advantages of the present invention will become more apparent from reading the following description of the preferred embodiments taken in connection with the accompanying drawings, wherein.

DETAILED DESCRIPTION OF THE INVENTION

Figure 1:
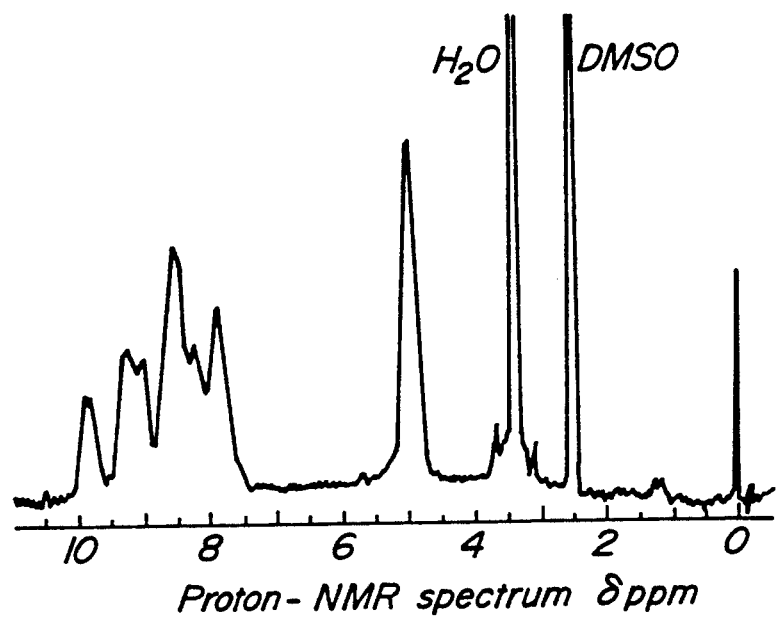
FIG. 1 is a diagram showing a proton-NMR spectrum of an embodiment of the polymer according to the present invention.

In this specification, the term "polyarylene" is meant by a polymer comprising an aromatic ring as a recurring structural unit, such as poly-p-phenylene or poly-1,4-naphthylene, and the term "aromatic ring" is understood to include heterocyclic rings such as pyridine, thiophene or the like, in addition to aromatic hydrocarbon rings such as a benzene ring.

The quaternary (iso)quinolinediyl polymers according to the present invention can be obtained by reacting an (iso)quinolinediyl polymers, with an equimolar amount or excess of an alkyl halide added thereto directly or in an organic solvent per monomer unit, followed by quaternization of the nitrogen atom in ring. A preferable reaction temperature ranges between 0° C. and boiling point of the solvent. The reaction completes between about 30 minutes and 24 hours. As the above organic solvent, for example, chloroform, methyl iodide, or the like can be employed.

A monoazine compound having a high basic nitrogen atom in a ring such as pyridine and quinoline is efficiently N-alkylated by reacting with alkyl halide or dialkyl sulfate [for example, see "Chemistry of Hetero Rign Compound" Kodan-sha Scientific (1989)]. This reaction is represented by the following formula (5):

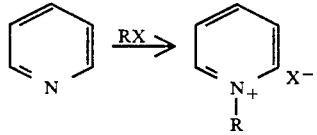
(5)

where, R is an alkyl group and X is halogen.

This reaction is the same type as that for preparing quaternary ammonium salt from aliphatic tertiary amine and alkyl halide. The reaction is represented by the following formula (6):

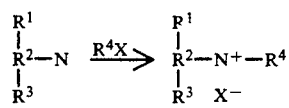
(6)

where, $R^1$, $R^2$, $R^3$ and $R^4$ are alkyl groups and X is halogen.

A tertiary poly(iso)quinolinediyl polymer of the present invention is obtained by a quaternization reaction, that is, by reacting alkyl halide with a poly(iso)quinolinediyl polymer using as a recurring structural unit a divalent group derived from quinoline or isoquinoline, excluding optional two hydrogen atoms, represented by the following formula (7) or (8):

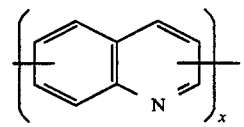
(7)

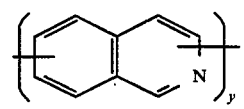
(8)

where, n is an integer of more than 5, and quaternary reacting a condensed heterocyclic unit by N-alkylation represented by the following formulae (9) and (10):

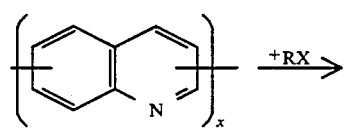
(9)

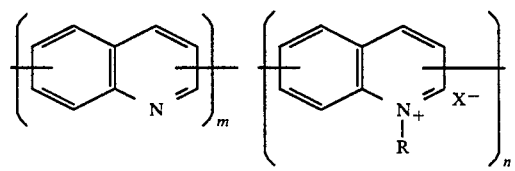

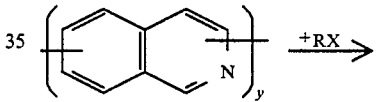
(10)

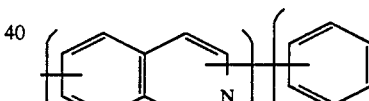

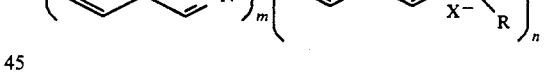

where, R is an alkyl group, X is halogen, and x, y or (m+n) is an integer of more than 5.

The poly(quinolinediyl)s and poly(isoquinolinediyl)s polymer for quaternization used in the above reaction is not particularly limited, but use may be made of a reaction product obtained by a dehalogenation polycondensation reaction, for example, by reacting a quinoline dihalide or isoquinoline dihalide compound with a more than equimolar zero valence nickel compound or electrolytically reducing a quinoline dihalide or isoquinoline dihalide compound in the presence of a nickel compound and the like (for example, Macromolecules, 24, 5883 (1991), Japanese Patent Application No. 3-234,809).

The present invention will be explained more concretely and detailedly by way of example hereinafter.

EXAMPLE 1

A 50 mg of poly(quinoline-4,7-diyl) represented by the following formula (11):

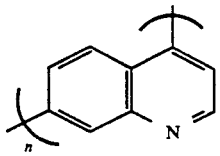

(11)

was dissolved in a 15 ml chloroform, and 2 ml of a 32 mmol methyl iodide solution were dropped into. The resulting mixture was reacted at a room temperature for 24 hours. By this reaction, a orange powdery (1-methylquinolinium-4,7-diyl iodide) polymer was obtained. This powdery polymer was isolated by filtering and then, washed with chloroform, and dried using a vacuum line. Elemental analysis values of the resulting polymer were found to be: 54.9% carbon, 3.6% hydrogen, 6.0% nitrogen and 35.5% iodine. The polymer constituted of the recurring structural unit represented by the following chemical formula (12)

(12)

gives the following calculated values: 44.6% carbon, 3.0% hydrogen, 5.2% nitrogen, and 47.2% iodine. In this example, a quaternary rate of this polymer was 60% (calculated values: 54.3% carbon, 3.3% hydrogen, 6.6% nitrogen, 35.9% iodine), and the yield of the polymer was 80%.

The above quaternized polymer was soluble in N,N-dimethylformamide, dimethyl sulfoxide, and the like. Therefore, the molecular weight of the polymer was determined by means of gel permeation chromatography (GPC) regard to a N,N-dimethylformamide solution of the polymer. As the result, it was found that the polymer had a number-average molecular weight of 4,900 corresponding to a degree of polymerization of about 23.

In addition, the infrared absorption spectrum of the above polymer showed the below-described absorptions.

3,045 w, 1,619 vs, 1,589 vs, 1,577 s, 1,502 s, 1,414 m, 1,363 m, 1,260 w, 1,218 m, 1.160 w, 1,028 w, 831 vs, 773 w, 718 w, 682 w, 612 w, where the numbers indicate positions of absorption in a cm$^{-1}$ number, and w, m, s and vs mean weak absorption, medium absorption, strong absorption and very strong absorption, respectively. The above results of the measurements were obtained all in a KBr pellet.

Additionally, the UV to visible region spectrum of a dimethylsulfoxide solution of the above polymer showed relatively sharp, clear and mountain-like maximal absorption peaks in the vicinity of about 340 nm.

As shown in FIG. 1, the proton NMR spectrum of the above polymer showed the following signal.

5.0 (bs, 1-methyl proton signal), 7.7–10.0 (bm, quinoline ring proton signal), (numerals show absorption positions showing ppm. bs and bm show one broad absorption and a multiple broad absorptions, respectively.) The above measurement results are in a deuterated dimethyl sulfoxide solution.

A signal based on —CH$_3$ proton at the N position is observed in the vicinity of 5.0 ppm, and signals based on quinolin ring proton are observed in 7.7–10.0 ppm.

When a quaternization ratio of the polymer was calculated from the integral ratio of the signal in the spectrum region, the ratio was 57%. This value is in good agreement with the degree of quaternization of the polymer determined by elemental analysis.

EXAMPLE 2

A orange, powdery (2-methylquinobinium-1,4-diyl iodide) polymer was obtained in the same manner as Example 1, except that isoquinoline-1,4-diyl polymer was used istead of quinoline-1,4-diyl polymer. This orange powdery polymer was isolated by filtering and then washed with chloroform, and dried using a vacuum line. Elemental analysis values of the resulting polymer were found to be: 52.9% carbon, 3.7% hydrogen, 6.4% nitrogen and 35.5% iodine. The calculated values of a polymer with the recurring structural unit represented by the following chemical formula (13)

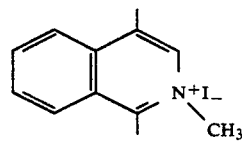

(13)

was 44.6% carbon, 3.0% hydrogen, 5.2% nitrogen and 47.2% iodine.

In this example, a quaternary rate of this polymer was 60% (calculated values: 54.3% carbon, 3.3% hydrogen, 6.6% nitrogen, 35.9% iodine), the yield of the polymer was 75%.

The above polymer was soluble in N,N-dimethylformamide, dimethyl sulfoxide, and the like. Therefore, the molecular weight of the polymer was measured by means of the gel permeation chromatography (GPC) with regard to a N,N-dimethylformamide of the polymer. As the result, it was found that the polymer had a number-average molecular weight of 5,800 corresponding to a degree of polymerization of about 27.

In addition, the infrared absorption spectrum of the above polymer showed the below-described absorptions.

3,044 w, 1,680 v, 1,566 s, 1,507 s, 1,502 s, 1,413 w, 1,373 m, 1,325 m, 1,257 m, 1,167 m, 1,027 w, 987 w, 918 w, 769 vs, 752 s, 687 w, 422 w, 414 w, where the numbers indicate positions of absorption in a cm$^{-1}$ number, and w, m, s and vs mean weak absorption, medium absorption, strong absorption and very strong absorption, respectively. The above results of the measurements were obtained all in a KBr pellet.

Additionally, the UV to visible region spectrum of a dimethyl sulfoxide solution of the above polymer showed relatively sharp, clear and mountain-like maximal absorption peaks in the vicinity of about 340 nm.

The proton NMR spectrum of the above polymer showed the following signal.

5.0 (bs, 1-methyl proton signal), 7.7–10.0 (bs, quinoline ring proton signal), (numerals show absorption positions showing ppm. bs and bm show one broad absorption and multiple broad absorptions, respectively.) The above measurement results are in a deuterated dimethyl sulfoxide solution.

A signal based on —CH₃ proton at the N position is observed in the vicinity of 5.0 ppm, and signals based on quinoline ring proton are observed in 7.7–10.0 ppm.

When a quaternization ratio of the polymer was calculated from the integral ratio of the signal in the spectrum region, the ratio was about 52%. This value essentially agrees with the degree of quaternization of the polymer determined by elemental analysis.

EXAMPLE 3

A yellow green, powdery, (1-terbuthylquinolinium-4,7-diyl bromide) polymer was obtained in the same manner as Example 1, except that 2 ml (17 mol) of 2-bromo-2-methylpropane was used in lieu of 2 ml (32 mmol) of methyliodide. This powdery polymer was isolated by filtering and then, washed with chloroform.

Elemental analysis values of the resulting polymer were found to be: 58.8% carbon, 4.0% hydrogen, 7.5% nitrogen and 29.7% bromine and almost agreed with calculated values (59.9% carbon, 5.3% hydrogen, 5.3% nitrogen and 30.3% bromine) of a polymer comprising the recurring structural unit represented by the following chemical formula (14)

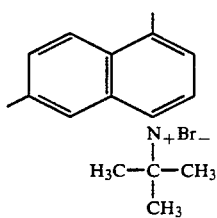

(14)

and found to promote the quaternary reaction perfectly. In this example, the yield of the polymer was approximately 70%.

The above polymer was partly soluble in N,N-dimethylformamide and dimethyl sulfoxide.

The infrared absorption spectrum of the above polymer showed the below-described absorptions.

3,050 w, 1,620 s, 1,595 vs, 1,445 w, 1,392 m, 1,355 w, 1,202 m, 1,090 w, 950 w, 880 w, 835 vs, 798 w, where the numbers indicate positions of absorption in a cm⁻¹ number, and w, m, s and vs mean weak absorption, medium absorption, strong absorption and very strong absorption, respectively. The above results of the measurements were obtained all in a KBr pellet.

The proton NMR spectrum of the above polymer showed the following signal.

4.9 (bs, tert-butyl proton signal), 7.7–9.5 (bs, quinoline ring proton signal), (numerals show absorption positions showing ppm. bs and bm show one broad absorption and a multiple broad absorptions, respectively.) The above measurement results are in a deuterated dimethyl sulfoxide solution.

A signal based on tert-butyl proton at the N position is observed in the vicinity of 4.9 ppm, and a signal based on quinolin ring proton is observed in 7.7–9.5 ppm.

EXAMPLE 4

The poly(1-methylquinolium-4,7-diyl iodide) polymer obtained in Example 1 was solved in a KCl aqueous solution of 0.3 mol/l and a cyclic voltammetry was measured. As a result, it was found that the polymer causes a two-step reduction reaction to SCE (saturated calomel electrode) at about −0.6 V and −0.8 V (potentials to SCE), and causes two-step oxidation at about −0.7 V and −0.4 V in sweep in the reverse direction.

There was observed such an electrochromic phenomenon that a color of the solution starts as pale yellow, in the electrochemical reduction, the electrode surface is colored to dark blue, and in the oxidation reaction, the color is changed to the original pale yellow. Such electrochemical behavior and discoloration phenomenon show that the polymer of the present invention is usable as a display material for electrochemically active and electrochromic display.

Moreover, an electrochemical behavior and a discoloration phenomenon obtained from the poly (1-methylquinolinium-4,7-diyl iodide) or the present invention are the same as the behavior obtained from 1,1'-disubstituted 4,4'-bipyridinium ion (vilologen). Viologen is a typical compound converted into radical cation and neutral molecule by electrochemical reduction in an electrolytic solution, and as the polymer of the present invention fundamentally has a π skeleton similar to that of viologen, it is assumed that there occurs conversion to radical cation and neutral molecule in the electrochemical oxidation reduction in the same manner as viologen.

Furthermore, when sodium hydrosulfite (Na₂S₂O₄) was added to an aqueous solution of the poly(1-methyl quinolinium-4,7-diyl iodide) polymer of the present invention, the solution was discolored from plate yellow to blackish blue. In the ultraviolet, visible absorption spectrum, a maximum peak was first observed in the vicinity of 280, 345 nm, and when Na₂S₂O₄ was added, broad maximum absorption was observed in the vicinity of 550 nm, and absorption was increased on the side of long wavelength. It is known that viologen shows the color spectrum with a peak in the vicinity of about 550 nm by the formation of radical cation in a reduction, and it is considered that color development of the polymer is due to the same formation of radical cation.

What is claimed is:

1. A quaternary (iso)quinolinediyl polymer comprising, as a recurring structural unit, a divalent group represented by the following chemical formula (1) or (2):

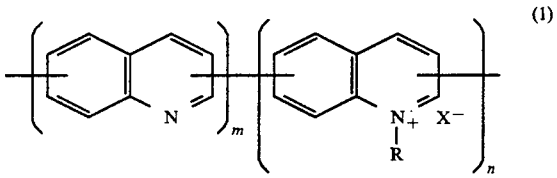

(1)

or

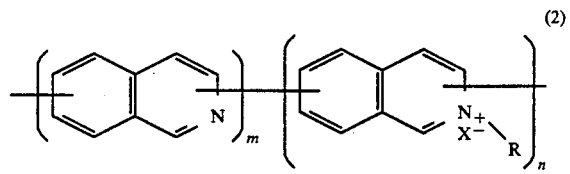

(2)

wherein m+n is an integer of at least 5 R represents an alkyl group, and X represents a halogen atom, and which divalent group is derived from a condensed heterocyclic compound in which nitrogen atom in ring is alkylated, quaternary (iso)quinoline by eliminating two hydrogen atoms at arbitrary positions thereof.

2. A process for preparing a quaternary (iso)quinolinediyl polymer comprising, as a recurring structural unit, a divalent group represented by the following chemical formula (1) or (2):

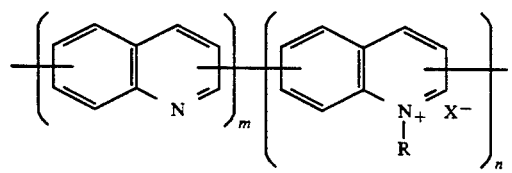  (1)

or

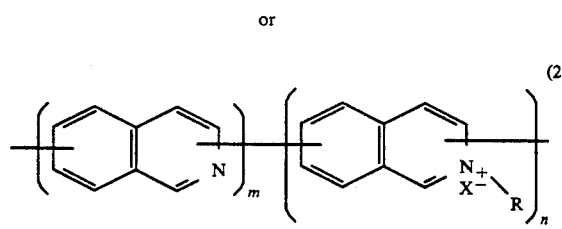  (2)

wherein m+n is an integer of at least 5, R represents an alkyl group and X represents a halogen atom, which process comprises reacting an (iso)quinoline polymer comprising, as a recurring structural unit, a divalent group represented by the following general formula (3) or (4):

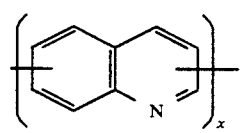  (3)

or

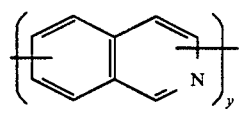  (4)

wherein x or y is an integer of over 5, and which divalent group is derived from (iso)quinoline, by eliminating two hydrogen atoms at arbitrary positions thereof, with an alkyl-halide.

3. A fiber or film composed of a quaternary (iso)-quinolinediyl polymer comprising, as a recurring structural unit, a divalent group represented by the following chemical formula (1) or (2):

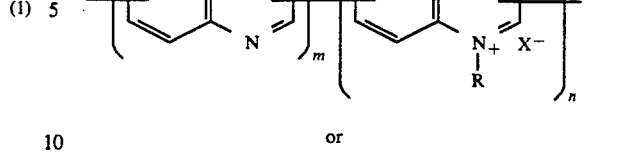  (1)

or

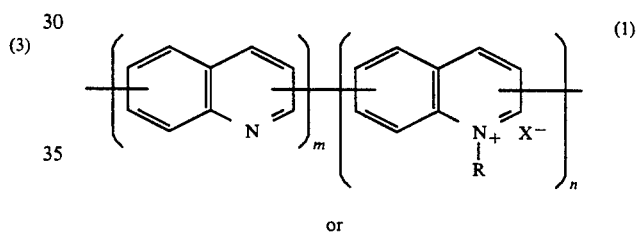  (2)

wherein m+n is an integer of at least 5 R represents an alkyl group and x represents a halogen atom, and which divalent group is derived from a condensed heterocyclic compound in which nitrogen atom in ring is alkylated, quaternary (iso)quinoline by eliminating two hydrogen atoms at arbitrary positions thereof.

4. An electrochromic element comprising a quaternary (iso)quinolinediyl polymer comprising, as a recurring structural unit, a divalent group represented by the following chemical formula (1) or (2):

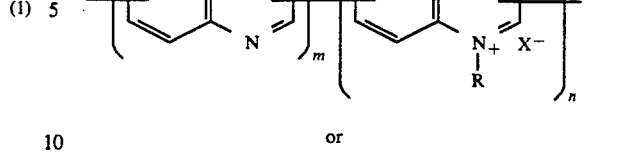  (1)

or

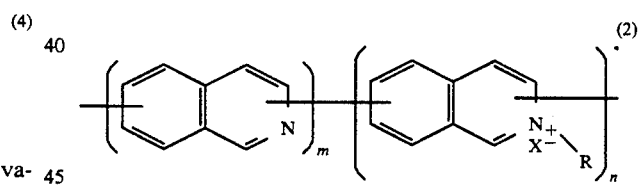  (2)

wherein m+n is an integer of at least 5 R represents an alkyl group and X represents a halogen atom, and which divalent group is derived from a condensed heterocyclic compound in which nitrogen atom in ring is alkylated, quaternary (iso)quinoline by eliminating two hydrogen atoms at arbitrary positions thereof.

* * * * *